United States Patent Office 3,475,345
Patented Oct. 28, 1969

3,475,345
CATALYST FOR PARAFFIN ISOMERIZATION
Hans A. Benesi, Berkeley, Calif., assignor to Shell Oil
Company, New York, N.Y., a corporation of Delaware
No Drawing. Filed June 7, 1967, Ser. No. 644,072
Int. Cl. B01j *11/60;* C07c *5/30*
U.S. Cl. 252—455                                  9 Claims

ABSTRACT OF THE DISCLOSURE

An improved catalyst for normal paraffin isomerization is prepared by ion-exchange of a hydrogenative metal on a synthetic mordenite specially treated in a three-step sequence of (a) hot acid, (b) cold acid and (c) hot ammonium compound.

BACKGROUND OF THE INVENTION

Field of the invention

This invention relates to the catalytic hydroisomerization of low molecular weight normal paraffins. More particularly, this invention involves a dual functional isomerization catalyst comprising hydrogenation components particularly palladium, composited with a specially treated crystalline form of the alumino-silicate zeolite mordenite.

Description of the prior art

The isomerization of low molecular weight normal paraffins is well established in the art. This reaction is of considerable importance in the petroleum industry and has in recent years undergone extensive development due to the substantially higher octane numbers of isoparaffins compared to their normal counterparts. Since gasoline blends require a distribution of boiling range materials, the isoparaffins in the $C_4$–$C_7$ range are valuable blending components. Moreover, the low octane number of the corresponding normal paraffins makes it highly desirable that these components be removed or minimized in high octane gasoline blends.

There are available, broadly speaking, two general types of isomerization processes; low temperature isomerization with a Friedel-Crafts catalyst such as aluminum chloride, and high temperature processes using a supported metal catalyst such as platinum on halogen acid activated alumina or silica-alumina.

Friedel-Crafts catalyzed systems suffer from several disadvantages. The relatively high corrosive nature of the catalysts require expensive alloy construction of reactor equipment. The aromatic and water contents of the feed must be limited and extensive cracking and sludge formation are difficult to deal with economically.

On the other hand, high temperature processes using supported metal catalyst have enjoyed increasing favor. Active investigation of the latter processes is indicated by the numerous patents and patent applications.

Much of the work with the supported systems involves catalysts comprising crystalline zeolitic alumino-silicates with and without hydrogenation promoters. See, for example, U.S. 3,140,252 and U.S. 3,190,939. While catalysts have now been discovered which give excellent results in isomerization as well as in other hydroconversion reaction improvements in the art are not only possible, but supported by sufficient economic incentive.

Benesi, U.S. 3,190,939 issued June 22, 1965 deals specifically with paraffin isomerization. The catalyst disclosed therein is a particular form of a crystalline zeolite known as mordenite which is converted from the sodium form to the acid or H form. The catalyst may be used alone or with incorporated metallic hydrogenation promoters. While mordenite is a naturally occuring mineral, a synthetic mordenite is available commercially from the Norton Company and marketed under the name Zeolon.

The present invention is an improved catalyst based on the use of a specially treated mordenite having a hydrogenation metal incorporated thereon by ion-exchange and in one embodiment subjected to a special calcination procedure. Mordenite is characterized by its high silicon to aluminum ratio of about 5:1 and its crystal structure. Compositions of mordenite as given in Kirk Othmer, "Encyclopedia of Chemical Technology," vol. 12, p. 297, is (Ca, $Na_2$)$Al_2Si_9O_{22}6H_2O$. The proposed structure is one in which the basic building block is a tetrahedron consisting of one silicon or aluminum atom surrounded by four oxygen atoms. The crystal is made up of chains of four- and five-membered rings of these tetrahedra. These four- and five-membered rings are believed to give the structure its stability. The chains are linked together to form a network having a system of large parallel channels interconnected by small cross channels. Rings of 12 tetrahedra form the large channels. Other synthetic zeolites also have such 12-membered rings, but they have interconnected cages whereas the mordenite has parallel channels of uniform diameter. For example, synthetic faujasite, which has the formula $Na_3Al_3Si_4O_{14}$ is characterized by a three-dimensional array of pores which consist of 12–13 A. cages interconnected through 8–9 A. windows.

Conversion of the sodium form to the hydrogen form is achieved either by the direct replacement of sodium ions with hydrogen ions or by replacement of sodium ions with ammonium ions followed by decomposition of the ammonium form by calcination. At least about 95% and preferably at least about 99%, of the alkali metal is removed by the ion-exchange. Chemical analysis of the calcined product of the ammonium form of mordenite shows that complete decomposition of the ammonium ion has occurred, yet the X-ray pattern of the product is the same as that of the original ammonium form. Thus, no attack on the crystalline alumino-silicate lattice is detected.

On the other hand, calcination of the ammonium form of other zeolites such as erionite and "X" faujasite destroys the crystalline alumino-silicate lattice. For example, a naturally occurring zeolite known as erionite which has the approximate formula $M_2Al_2Si_7O_{18}$, where M represents exchangeable alkaline and alkaline earth metal ions, can be converted to the ammonium form by extensive washing with ammonium nitrate solution. X-ray diffraction films of the product before and after calcination in air at 932° F. indicate that most of the crystalline alumino-silicate lattice is destroyed during calcination to form amorphous material. Similarly, a synthetic faujasite denoted as 13X by the manufacturer, Linde Company, and having the formula $Na_3Al_3Si_4O_{14}$, can be converted to the ammonium form. X-ray examination of the decomposition product of the ammonium form of this faujasite shows that extensive destruction of the lattice occurs in this case also. Again, amorphous material is formed.

SUMMARY OF THE INVENTION

While the hydrogen form of mordenite as disclosed in my earlier patent is an excellent catalyst for isomerization of normal paraffins it has now been discovered that an even better catalyst can be prepared by treating mordenite with a special three-step procedure and incorporation of a hydrogenation metal component by ion-exchange. In one embodiment, the catalyst can be further improved by a two-step calcination.

In broad aspect, the invention is a three-step treatment of sodium mordenite comprising (a) a hot acid treatment, (b) a cold acid treatment followed by (c) treatment with an ammonium compound. The metal is incorporated on the triple treated mordenite by ion-exchange from an ammoniacal complex solution, the resulting catalyst composite having improved selectivity and activity.

Further improvement is obtained by subjecting the metal-mordenite catalyst composite to a special calcination schedule. The calcination schedule involves heating the catalyst composite in air to a temperature of about 660° F. and then to about 1020° F. in two steps rather than a single step calcination at about 550° C. which is customary.

For the acid treatment, both organic or inorganic acids can be used, strong acids being preferred. Examples of acids which are particularly suitable are strong mineral acids such as $H_3PO_4$, $H_2SO_4$, $HNO_3$ and HCl. HCl is especially suitable and is the preferred acid for the practice of the invention in both the hot and cold treating steps. As a rule, aqueous solutions of the acid are preferred. The concentrations may vary over a broad range from 0.1–10 N. It is convenient and especially preferred to use an acid in aqueous solution of 2 N concentration.

For the "hot" acid treating step the temperature preferred is about the boiling temperature of the acid solution. Temperatures in the range of about 200–300° F. are contemplated. The cold acid treatment is conducted at a temperature from about 50–100° F. and preferably at ambient temperatures.

The ammonium compound treating step is carried out with any ammonium compound which can form ammonium ions. However, aqueous solutions of neutral non-acidic ammonium compounds are preferred, especially inorganic ammonium compounds such as $NH_4OH$, $NH_4Cl$, $NH_4$ sulfates, $NH_4$ phosphates and $NH_4NO_3$. $NH_4NO_3$ is preferred.

Concentration of the ammonium compound is not especially critical and can vary from .1 to 5 M. However, it is preferred to use a solution of about 1 M concentration. Temperature of the ammonium compound treatment can vary over a range of 32–300° F. It is preferred that a hot solution of ammonium compound be used, i.e., a solution at about the boiling temperature.

Metal is incorporated on the mordenite from any solution in which the metal can exist in the cationic form. The use of cationic metal results in ion-exchange of the metal for ammonium ions in the mordenite and is preferred over impregnation with a compound in which the metal exists in the anionic state. Especially suitable are ammoniacal solutions wherein the metal exists in the form of a cationic complex. It is preferred that the dehydrogenation metal be a Group VIII metal and particularly a noble metal component and especially preferred that the metal be palladium.

The amount of metal incorporated in the catalyst should be at least about 0.05% w. basis finished catalyst and not exceeding about 5° w. It is preferred that the metal content be at least about 0.1% w. and not over 1.5% w.

The time required for each of the treating steps in the procedure according to the invention will depend upon concentration, temperature and contacting efficiency. In general, the hot acid treatment should be continued for at least 30 minutes and preferably from 1–2 hours. No particular advantage is apparent for increased contact time. The cold acid treatment requires less time; usually 15–60 minutes will suffice. Longer times can be used, but are of no particular advantage.

Treatment with the ammonium compound should be conducted for at least 30 minutes if hot solution is used. If cold ammonium solution is used multiple treatments for extended time are required, for example, final washes for a total of 20–30 hours. With boiling ammonium compound solutions it is preferred to treat the catalyst for 1–2 hours.

Since acid and/or ammonium compound treatment of mordenite to convert the sodium form to the acid form is known and disclosed in the prior art it is somewhat surprising that the special sequence of steps results in an improved catalytic composite. However, such improvement is obtained as will be shown in the examples to follow.

It is therefore helpful in understanding the invention to consider the most probable explanation of the effects of these sequential steps. It is not intended, however, that the explanation be binding or limiting on the invention.

Removal of the sodium from the mordenite is apparently very important for catalytic activation. The hot acid treatment is very effective in removing sodium and greatly reduces the time required for substantial sodium removal. Moreover, the use of hot acid is probably effective in loosening tenaciously held sodium which would not be easily removed by a milder, low temperature acid or ammonium compound treatment. Thus, the hot acid treatment is highly desirable for effective and rapid sodium removal. However, it is believed that treatment with hot acid also dissolves or loosens some of the aluminum ions from the alumino-silicate structure and that the aluminum ions thus loosened tend to clog the ion-exchange sites thereby reducing the effectiveness of the hydrogenation metal incorporation.

Treatment with cold acid acts to remove these interfering aluminum ions. Treatment with ammonium compounds serves two functions; removal of the final traces of sodium, and enhanced ion-exchange ability. Acid treatment often leaves traces of sodium. Treatment with ammonium compounds is effective for substantially complete sodium removal. Moreover, the treatment with ammonium leaves ammonium ions in the catalyst ion-exchange sites which readily exchange with the palladium cations.

Thus, each step in the treatment serves a special function which in combination with the other steps results in a superior catalyst.

Calcination of the finished catalyst composite by the two-step calcination sequence reduces the tendency for destruction of the catalyst and results in a more effective removal of water and ammonia impurities without impairing the metal/mordenite coordination which gives rise to catalytic activity.

Catalysts prepared in accord with the invention are particularly suitable for isomerization of normal paraffins having 4 through 7 carbon atoms per molecule.

Feed to an isomerization process using catalysts of the invention can be a substantially pure normal paraffin having from 4 through 7 carbon atoms, mixtures of such normal paraffins, or hydrocarbon fractions rich in such normal paraffins. Suitable hydrocarbon fractions are the $C_4$ to $C_7$ straight-run fractions of petroleum.

The process of the invention is conducted at a temperature in the range from about 400° to 650° F. and preferably from about 450° to 600° F. At lower temperatures, conversion of normal paraffins is generally too low to be practical, although selectivity to isoparaffins is substantially 100%. At higher temperatures, conversion of normal paraffins is quite high; however, excessive cracking is encountered and selectivity to isoparaffin is extremely low as a result.

The isomerization reaction can be conducted over a wide range of space velocities, but in general the space velocity is in the range from about 0.5 to 10 and preferably from about 1 to 5. In general, conversion of normal paraffins decreases with an increase in space velocity, although selectivity to the isoparaffin is increased. Space velocity, as the term is used herein, refers to WHSV and is expressed as weight of feed per hour per unit weight of catalyst.

The isomerization reaction is carried out in the presence of hydrogen; however, there is little or no net consumption of hydrogen in the process. Any consumption of hydrogen is the result of hydrocracking reactions and it is preferred to keep such reactions to a minimum. The function of the hydrogen is primarily to improve catalyst life, apparently by preventing polymerization of intermediate reaction products which would otherwise polymerize and deposit on the catalyst. A hydrogen to oil mole ratio of from about 1:1 to 25:1 and preferably from about 2:1 to 15:1 is used. It is not necessary to employ pure hydrogen since hydrogen-containing gases, e.g., hydrogen-rich gas from the catalytic reforming of naphthas, are suitable. Total pressure is in the range from about atmospheric to 1000 pounds per square inch gauge (p.s.i.g.) and preferably from about 300 to 750 p.s.i.g.

DESCRIPTION OF A PREFERRED EMBODIMENT

To further illustrate the invention the following preferred embodiment of the catalyst treatment and preparation will be described.

A quantity of the sodium form of synthetic mordenite powder, such as is available from Norton Company is subjected to the following treatments.

The mordenite powder is placed in a suitable vessel with a 2 N solution of HCl in an amount to just cover the powder. The solution is boiled, with stirring, for 1 hour. The HCl is drained off, the powder washed with distilled water and stirred with an equal amount of 2 N HCl solution for 30 minutes at ambient temperature. The HCl is again drained off, the mordenite washed with distilled water and the mordenite powder mixed with a solution of $NH_4NO_3$ of 2 N concentration. The solution is boiled for 1–2 hours.

The treated powder is washed with distilled water until no ammonium ions are detected in the wash water.

An ammoniacal palladium chloride solution is prepared by the addition of excess ammonium hydroxide to an acidified solution of palladium chloride. The treated mordenite powder is stirred with the ammoniacal palladium for 1 hour, washed, dried and formed into pellets or pills.

Calcination in air is carried out by placing the resulting catalyst in a furnace and raising the temperature to 662° F. The catalyst is held at 662° F. for 2 hours and the temperature then raised to 1022° F. where it is maintained for 16 hours.

The catalyst is then ready for use in isomerization reactions.

The advantages of the invention are illustrated by the following examples.

EXAMPLE I

A number of experiments were carried out to study the effect of preparation of mordenite supports for n-paraffin isomerization. Various sequences of pretreating steps were used and the resulting catalysts were tested for isomerization. Isomerization activity was measured by use of the catalyst for n-hexane isomerization over a 2 hour period in a flow reactor at 500° F., WHSV (weight hourly space velocity) of 6, a pressure of 600 p.s.i.g. and a $H_2$ to feed molar ratio of 5.

Catalyst preparation sequence, metal content, and isomerization test results are summarized in Table 1.

TABLE 1

| Catalyst | Metal Content, percent wt. | Treatment sequence | n-hexane Conversion, percent | Isohexanes in product, percent wt. |
|---|---|---|---|---|
| A | 1.0 Pt | Hot, 2 N HCl; cold, 1 M $NH_4NO_3$. | 28.7 | 27.9 |
| B | 0.5 Pd | Hot, 2 N HCl; cold, 1 M $NH_4NO_3$. | 26.9 | 26.5 |
| C | 0.5 Pd | Hot, 2 N HCl; cold, 2 N HCl; hot, 1 M $NH_4NO_3$. | 34.5 | 34.1 |
| D | 1.0 Pd | Hot, 2 N HCl; cold, 2 N HCl; hot 1 M $NH_4NO_3$. | 36.1 | 35.8 |

The treatments of the support listed in Table 1 have the following meaning. "Hot" treatment with solutions of HCl or an ammonium salt denotes digestion of the support for 1 hour in boiling solution. "Cold" HCl treatment is carried out by stirring the support in 2 N HCl for 30 minutes at room temperature. The "cold" $NH_4NO_3$ treatment consists of repeated equilibration with five fresh portions of 1 M $NH_4NO_3$ at rom temperature over a period of 32 hours.

In order to insure that members of a given series of samples contained the same percentage of catalytic metal, each catalyst was prepared by contacting the support with an appropriate quantity of metal reagent. The ammoniacal platinum chloride was prepared by addition of excess ammonium hydroxide to chloroplatinic acid. (The orange precipitate of ammonium chloroplatinate that is initially formed dissolves to form a platinum-amine complex when the suspension is heated to boiling.) Ammoniacal palladium chloride was similarly prepared by addition of excess ammonium hydroxide to an acidified solution of palladium chloride. Ammoniacal solutions were used because the noble metal is in the form of a cationic complex in these reagents, and can thus be incorporated by ion-exchange. Mordenite used for the test was a powdered form of Na-Zeolon obtained from Norton Company.

As can be seen from Table 1 the triple treatment sequence of the invention greatly improves catalyst activity. Comparing Catalysts B and C shows the direct effect of the three-part treating sequence. Comparison of Catalysts A and B shows the advantage of using palladium, wherein with only half the metal content the palladium catalyst shows nearly the same isomerization performance. It is also noteworthy that palladium is about ⅓ the cost of platinum. Comparison of Catalysts C and D shows the effect of metal content for catalyst prepared according to the invention.

EXAMPLE II

Catalyst C in Table 1 was tested for n-hexane isomerization in a flow reactor at 500° F., 300 p.s.i.g. pressure, WHSV of 1.0 and a $H_2$/feed ratio of 2.5.

Product distribution is shown in Table 2.

TABLE 2

| | |
|---|---|
| n-Hexane conversion, percent | 81.4 |
| Products, percent wt.: | |
| $C_1$–$C_2$ | 0.4 |
| $C_3$ | 1.7 |
| i-$C_4$ | 1.5 |
| n-$C_4$ | .5 |
| i-$C_5$ | 1.4 |
| n-$C_5$ | .3 |
| 2,2-DMB [1] | 16.0 |
| 2,3-DMB 2-MP [2] | 44.0 |
| 3 MP | 15.5 |
| n-$C_6$ | 18.6 |

[1] 2,2-dimethylbutane.
[2] 2-methyl pentane.

The selectivity of the catalyst is demonstrated by the high conversion to 2,2-dimethylbutane which is the hexane isomer most difficult to produce, and the low conversion to gaseous $C_1$–$C_4$ products.

This test was carried out over a two-day period and catalyst activity did not change during the 16 hours of use.

EXAMPLE III

To demonstrate the effect of calcination schedule, a catalyst prepared by the method of Catalyst A, Table 1 was used. In one case the catalyst was calcined for 16 hours at 1022° F., in the second case the catalyst was calcined at 662° F. for 2 hours and then at 1022° F. for 16 hours. Calcination was carried out in air in both cases. When tested under the isomerization condition discussed in Example I, the one-step calcined catalyst gave 14.2% w. conversion with 14.1% w. isohexane in the product. The catalyst prepared by the two-step method gave 23.2% w. conversion with 22.6% w. isohexanes in the products.

I claim as my invention:

1. A method of preparing a paraffin isomerization catalyst which comprises subjecting a crystalline mordenite to a sequential treatment with (a) hot acid, (b) cold acid, and (c) hot ammonium compound, and exchanging ions of hydrogenative metal into the treated catalyst.

2. The method of claim 1 wherein the hot acid treatment is effected at 200–300° F., the cold acid treatment at 50–100° F. and the hot ammonium compound treatment at 200–300° F.

3. The method of claim 2 wherein the hot acid and ammonium treatment are effected with boiling aqueous solutions.

4. The method of claim 1 wherein the hydrogenative metal is palladium.

5. The method of claim 4 wherein an ammoniacal solution of palladium is used for the ion-exchange, the acid being selected from a group consisting of $H_2PO_4$, $H_2SO_4$, $HNO_3$ and HCl and the ammonium compound selected from a group consisting of $NH_4OH$, $NH_4Cl$, $NH_4$ sulfates, $NH_4$ phosphates and $NH_4NO_3$.

6. The method of claim 4 wherein the finished catalyst contains from 0.05% w. to 5% w. palladium.

7. The method of claim 1 wherein the resulting composite is subjected to a two-step calcination, the first step at a temperature of 660° F. and the second step at a temperature of above about 1000° F.

8. The method of claim 6 wherein the catalytic composite is subjected to a two-step calcination, the first step being at a temperature in the range of 660° F. and the final temperature at above about 1000° F.

9. The method of claim 5 wherein the acid is HCl in about a 2 N aqueous solution and the ammonium compound is $NH_4NO_3$ in about 1 M concentration in aqueous solution.

References Cited

UNITED STATES PATENTS

| 2,971,904 | 2/1961 | Gladrow et al. | 252—455 X |
| 3,130,006 | 4/1964 | Rabo et al. | 252—455 X |
| 3,140,249 | 7/1964 | Plank et al. | 252—455 X |
| 3,190,939 | 6/1965 | Benesi. | |
| 3,367,884 | 2/1968 | Reid | 252—455 |

DANIEL E. WYMAN, Primary Examiner

C. F. DEES, Assistant Examiner

U.S. Cl. X.R.

23—112; 208—137; 252—450